(12) United States Patent
Yoshida et al.

(10) Patent No.: US 8,911,702 B2
(45) Date of Patent: Dec. 16, 2014

(54) OPTICAL COMPONENT AND METHOD FOR MANUFACTURING SAME

(71) Applicants: Sumitomo Electric Industries, Ltd., Osaka-shi (JP); Sumitomo Electric Hardmetal Corp., Itami-shi (JP)

(72) Inventors: Katsuhito Yoshida, Itami (JP); Kenichi Kurisu, Itami (JP); Tatsuya Kyotani, Itami (JP)

(73) Assignees: Sumitomo Electric Industries, Ltd., Osaka-shi (JP); Sumitomo Electric Hardmetal Corp., Itami-shi (JP)

( * ) Notice: Subject to any disclaimer, the term of this patent is extended or adjusted under 35 U.S.C. 154(b) by 0 days.

(21) Appl. No.: 14/004,139

(22) PCT Filed: Sep. 28, 2012

(86) PCT No.: PCT/JP2012/075037
§ 371 (c)(1),
(2), (4) Date: Sep. 9, 2013

(87) PCT Pub. No.: WO2013/132686
PCT Pub. Date: Sep. 12, 2013

(65) Prior Publication Data
US 2014/0147374 A1 May 29, 2014

(30) Foreign Application Priority Data

Mar. 9, 2012 (JP) ................................. 2012-053013

(51) Int. Cl.
*C04B 35/00* (2006.01)
*C04B 35/645* (2006.01)
*G02B 1/02* (2006.01)
*C04B 35/547* (2006.01)
*G02B 3/00* (2006.01)

(52) U.S. Cl.
CPC .............. *G02B 1/02* (2013.01); *C04B 2235/656* (2013.01); *C04B 35/547* (2013.01); *G02B 3/00* (2013.01); *C04B 2235/9638* (2013.01); *C04B 35/645* (2013.01); *C04B 2235/78* (2013.01); *C04B 2235/786* (2013.01); *C04B 2235/77* (2013.01)
USPC ........................................... 423/509; 264/1.1

(58) Field of Classification Search
CPC .......... C04B 35/00; C04B 35/645; G02B 1/02
USPC ............................................ 423/509; 264/1.1
See application file for complete search history.

(56) References Cited

U.S. PATENT DOCUMENTS

| | | | | | |
|---|---|---|---|---|---|
| 3,454,358 | A | * | 7/1969 | Roy | ................................. 423/99 |
| 3,454,685 | A | * | 7/1969 | Parsons et al. | ................ 264/1.21 |
| 2003/0020887 | A1 | | 1/2003 | Hasegawa | |
| 2004/0212107 | A1 | | 10/2004 | Hasegawa | |
| 2008/0257872 | A1 | | 10/2008 | Muys | |
| 2008/0264913 | A1 | | 10/2008 | Muys | |
| 2011/0176958 | A1 | | 7/2011 | Hasegawa et al. | |

FOREIGN PATENT DOCUMENTS

| | | | | | |
|---|---|---|---|---|---|
| GB | 1013156 | A | * | 12/1965 | ............... G02B 1/02 |
| GB | 2125023 | A | * | 2/1984 | ............... G02B 1/02 |
| JP | 57-106507 | A | * | 7/1982 | ............... C01B 19/04 |
| JP | 57-111211 | A | * | 7/1982 | ............... C01B 19/04 |
| JP | 4-340901 | A | | 11/1992 | |
| JP | 5-043359 | A | | 2/1993 | |
| JP | 2002-234774 | A | | 8/2002 | |
| JP | 2009-517217 | A | | 4/2009 | |
| JP | 2011-013354 | | | 1/2011 | |
| WO | WO-03/055826 | A1 | | 7/2003 | |
| WO | WO-2009/142238 | A1 | | 11/2009 | |

OTHER PUBLICATIONS

Office Action in Japanese Patent Application No. 2012-053013 dated Jul. 16, 2013.
International Search Report in International Application No. PCT/JP2012/075037 dated Dec. 25, 2012.
Notice of Grounds of Rejection in Japanese Patent Application No. 2012-053013, dated Oct. 15, 2013.

* cited by examiner

*Primary Examiner* — Timothy Vanoy
(74) *Attorney, Agent, or Firm* — Venable LLP; Steven J. Schwarz; F. Brock Riggs

(57) ABSTRACT

An optical component of the present invention is composed of a ZnSe polycrystal body, and the ZnSe polycrystal body is constituted by crystal grains with an average grain size larger than or equal to 50 μm and smaller than or equal to 1 mm and has a relative density higher than or equal to 99%.

3 Claims, No Drawings ously has a high transmittivity in a wide wavelength range of light from a visible range to an infrared range, the above-described conventional method without employing machining could not be used, causing reduction of the manufacturing cost to be difficult. Consequently, development of a method using a ZnSe polycrystal body synthesized through the CVD method to produce an optical component in an inexpensive manner without employing machining has been demanded.

OPTICAL COMPONENT AND METHOD FOR MANUFACTURING SAME

TECHNICAL FIELD

The present invention relates to an optical component and a method for manufacturing the same.

BACKGROUND ART

ZnSe (zinc selenide) is superior in characteristics of transmitting infrared light. Therefore, zinc selenide is employed in optical components, such as window material and lens material, of a carbon dioxide gas laser used for cut processing, sheet-metal processing, and the like. ZnSe employed in such optical components is formed to have various component shapes by synthesizing the material through a CVD method (also referred to as a chemical vapor deposition method, a chemical vapor phase growth method, or the like) and then applying machining, such as grinding and polishing, to the material.

The manufacturing cost for such optical components is highly dominated by the material cost and the machining cost. Reduction of these costs is important for the widespread use of optical components made of ZnSe. Machining such as grinding and polishing is not only time-consuming but also causes more or less waste of material in the form of machining chips due to cutting out a component shape from a large piece of material, leading to a rise in the manufacturing cost.

As a method for manufacturing an optical component made of ZnSe in a more inexpensive manner, there has been proposed a method of applying machining to a minimum extent. For example, WO2003/055826 (PTD 1) proposes a method of using a pressure/heat press to perform net-shape deformation to obtain a final shape from raw material powder. Further, Japanese Patent Laying-Open No. 05-043359 (PTD 2) proposes a method of press-molding a polycrystal body constituted by fine crystals.

CITATION LIST

Patent Document

PTD 1: WO03/055826
PTD 2: Japanese Patent Laying-Open No. 05-043359

SUMMARY OF INVENTION

Technical Problem

According to the method disclosed in PTD 1, raw material powder is shaped and sintered to produce a sintered compact having a relative density higher than or equal to 55% and lower than or equal to 80%, and then the sintered compact is pressed under a high temperature condition to deform into the final shape. This method does not use machining but uses raw material in a form of powder, and the raw material powder is deformed into a component shape while being sintered. Therefore, incorporation of impurities is inevitable, and an adverse effect with respect to transmittivity is of concern.

According to the method disclosed in PTD 2, a molded item is produced by press-forming a sintered compact (polycrystal body) having an average grain size smaller than or equal to 3 μm under a temperature of 1300-1500° C. Since this method utilizes creep deformation of a polycrystal body, use of a sintered compact having a small crystal grain size is required so as to cause grain boundary sliding and facilitate the creep deformation. Therefore, although this method does not use machining, cracks and breaks may occur in a polycrystal body having a large crystal grain size due to a lowered creep deformation rate and a lowered strength of a sintered compact. Since a ZnSe polycrystal body synthesized through the CVD method generally has a crystal grain size larger than or equal to 10 μm, the method of PTD 2 cannot be applied.

Therefore, although a ZnSe polycrystal body synthesized through the CVD method advantageously has a high transmittivity in a wide wavelength range of light from a visible range to an infrared range, the above-described conventional method without employing machining could not be used, causing reduction of the manufacturing cost to be difficult. Consequently, development of a method using a ZnSe polycrystal body synthesized through the CVD method to produce an optical component in an inexpensive manner without employing machining has been demanded.

The present invention was achieved in view of the present situation described above, and its object is to provide an optical component capable of being manufactured in an inexpensive manner using a ZnSe polycrystal body synthesized through the CVD method and without employing machining.

Solution to Problem

The inventors conducted diligent study to solve the problem described above. Although a ZnSe polycrystal body having a relatively large crystal grain size and synthesized by the CVD method has been considered that shaping into a component shape can be performed only by machining, the inventors found out that such a ZnSe polycrystal body can be shaped to have a component shape by using a press-molding method with a certain condition employed. The inventors also found out that the ZnSe polycrystal body processed under such a condition has particular characteristics, and conducted further study based on the finding to achieve the present invention.

Specifically, the optical component of the present invention is composed of a ZnSe polycrystal body, and the ZnSe polycrystal body is constituted by crystal grains with an average grain size larger than or equal to 50 μm and smaller than or equal to 1 mm and has a relative density higher than or equal to 99%.

The present invention also relates to a method for manufacturing the optical component described above. The method includes a first step of synthesizing a ZnSe polycrystal body through a CVD method, and a second step of press-molding the ZnSe polycrystal body synthesized in the first step. The second step is conducted under a condition that a load is applied for at least 5 minutes in an inert gas atmosphere at a temperature higher than or equal to 920° C. and lower than or equal to 1030° C. and a pressure higher than or equal to 20 MPa and lower than or equal to 60 MPa.

Herein, preferably, the second step is conducted by setting the ZnSe polycrystal body in a press-molding die, and the press-molding die is made of glassy carbon or a sintered compact of silicon carbide.

Advantageous Effects of Invention

A superior effect is that the optical component of the present invention has the favorable advantage that it can be manufactured in an inexpensive manner.

DESCRIPTION OF THE PREFERRED EMBODIMENT

Hereinafter, the present invention will be described more in detail.

<Optical Component>

An optical component of the present invention is composed of a ZnSe polycrystal body, and the ZnSe polycrystal body is constituted by crystal grains with an average grain size larger than or equal to 50 µm and smaller than or equal to 1 mm and has a relative density higher than or equal to 99%.

Herein, the average grain size is an average value obtained by etching the optical component (ZnSe polycrystal body) with hydrochloric acid, taking a picture with a magnification of 20 times using an optical microscope, drawing five straight lines of 60 mm on the picture, and measuring distances between grain boundaries of the crystal grains present on each line.

When the average grain size is smaller than 50 µm, the absorption rate is lowered disadvantageously in the visible range due to grain boundary scattering. When the average grain size is larger than 1 mm, there is a high risk of breakage during the stage of molding. This average grain size is preferably larger than or equal to 50 µm and smaller than or equal to 300 µm.

Further, the relative density is a relative ratio with respect to a theoretical density of ZnSe (5.27 g/cm$^3$). The relative density can be calculated by dividing a specific weight measured through the Archimedes method by the theoretical density. The relative density lower than 99% means that a non-negligible number of pores are present, so that great scattering of light due to the presence of pores renders ZnSe unusable for an optical component. Since the upper limit of the relative density is preferably set to be as high as possible, and an ideal relative density is 100%, there is no need to particularly restrict the upper limit of the relative density. The relative density is more preferably higher than or equal to 99.8%.

Such an optical component of the present invention is a component incorporated in various devices utilizing infrared light and the like to provide optical functions, and includes, for example, window material and lens material of a carbon dioxide gas laser used for cut processing and/or sheet-metal processing.

Such an optical component of the present invention is manufactured by the manufacturing method described herebelow. In other words, the optical component manufactured by the manufacturing method described herebelow exhibits the characteristics described above. Therefore, the present invention exhibits a superior effect that an optical component can be manufactured in an inexpensive manner without employing machining such as grinding and polishing.

<Manufacturing Method>

The optical component of the present invention is manufactured by the manufacturing method described herebelow. Specifically, the manufacturing method includes a first step of synthesizing a ZnSe polycrystal body through a CVD method, and a second step of press-molding the ZnSe polycrystal body synthesized in the first step. The second step is conducted under a condition that a load is applied for at least 5 minutes in an inert gas atmosphere at a temperature higher than or equal to 920° C. and lower than or equal to 1030° C. and a pressure higher than or equal to 20 MPa and lower than or equal to 60 MPa. In other words, the manufacturing method of the present invention exhibits an effect that an optical component can be manufactured in an inexpensive manner using a ZnSe polycrystal body synthesized through the CVD method to have a relatively large crystal grain size without employing machining such as grinding and polishing.

Herein, preferably, the second step is conducted with the ZnSe polycrystal body set in a press-molding die, and the press-molding die is made of glassy carbon or a sintered compact of silicon carbide.

As a result of conducting a research on characteristics in a high temperature condition for the ZnSe polycrystal body synthesized through the CVD method, the inventors found out that the polycrystal body is softened at a temperature higher than or equal to 920° C. and elastically deformed with application of a load. Higher the temperature of providing elastic deformation facilitates more deformation. However, decomposition of ZnSe starts at a temperature exceeding 1030° C. in an inert gas atmosphere. Therefore, it was found out that molding should be conducted at a temperature higher than or equal to 920° C. and lower than or equal to 1030° C. More preferable temperature is higher than or equal to 950° C. and lower than or equal to 1020° C.

In terms of preventing oxidization of ZnSe, the atmosphere for causing elastic deformation under heating requires heating in vacuum with a pressure lower than or equal to $1\times10^{-3}$ Pa or heating in an atmosphere of inert gas such as Ar or nitrogen. However, since decomposition of ZnSe starts beyond the temperature of 950° C. in the case of heating in vacuum, heating is preferably performed in an inert gas atmosphere.

On the other hand, since a lens generally has a concave shape or a convex shape and is accompanied by deformation in the stage of molding, the pressure area in the stage of molding is changed along with the deformation and remains inconstant when a lens is molded as an optical component. For example, since a contact area between a molding die and material (ZnSe polycrystal body) increases along with the deformation, maintaining a constant pressure to be applied is difficult, and it is not always necessary to maintain the constant pressure.

As to such a pressure in the stage of molding, the pressure applied during the end stage of deformation, where a contact area between the molding die and material becomes greater, is important. Therefore, a molding pressure preferably employs the pressure conditions higher than or equal to 20 MPa and lower than or equal to 60 MPa, based on a pressure calculated by dividing an applied load by a contact area after deformation (in other words, the surface area of an optical component). When the pressure is lower than 20 MPa, there is a case where deformation is not sufficient. When the pressure is higher than 60 MPa, there is a case where a breakage such as cracking in the polycrystal body may occur. More preferably, the range is higher than or equal to 25 MPa and lower than or equal to 50 MPa.

Further, as the method for pressing, the method of gradually increasing the load with time can compensate for increase in the contact area between a die and material. The rate of increasing the load is preferably slow. However, the rate is limited in relation to productivity. Generally, the rate is preferably higher than or equal to 0.2 MPa/second and lower than or equal to 0.5 MPa/second. The rate of deformation in this stage exhibits a value of about $3\times10^{-4}$/second to $1\times10^{-3}$/second. The rate of deformation described herein is a value ($\Delta L/L/T$) calculated by dividing a deformation volume of material ($\Delta L$) by the original size of material (L) and the time (T) required for deformation.

After undergoing such processes, the ZnSe polycrystal body synthesized through the CVD method (the ZnSe polycrystal body synthesized in the first step) is molded into an optical component through press-molding (second step) employing the conditions described above. Heating and pressing during press-molding causes deformation as well as re-crystallization of the ZnSe polycrystal body to allow the growth of crystal grains. The growth of the crystal grain is dependent on a heating temperature and a heat time. To finish up with a final shape of the optical component, pressing and heating should be performed for at least 5 minutes. In other words, a load should be applied for at least 5 minutes in the second step.

In the stage of press-molding, deformation due to pressure causes distortion, and the amount of distortion becomes greater, depending on the rate of deformation. Therefore, to reduce the distortion, pressure deformation is preferably performed with gradual deformation over a long period of time. On the other hand, taking excessive time for the pressure deformation causes crystal grains to be enlarged due to the grain growth, thereby deteriorating the shape accuracy after deformation. The molding time achieving a shape with less distortion and higher accuracy differs in accordance with the temperature. Therefore, the molding time cannot be set uniquely. However, as described above, the time should be at least 5 minutes, and more preferably longer than or equal to 5 minutes and shorter than or equal to 30 minutes.

Further, when the time is longer than 30 minutes, the shape accuracy may be deteriorated due to excessive growth of grains, and may cause a disadvantageous breakage in the worst case.

As described above, the second step is conducted with the ZnSe polycrystal body set in the press-molding die. The press-molding die is preferably made of glassy carbon or a sintered compact of silicon carbide. This is because: the strength is maintained at a high temperature around 1000° C.; a reactivity to ZnSe is low; and the thermal expansion coefficient is small. Herein, glassy carbon is carbon in a form of glass having an air permittivity of 0 (zero).

The conditions for the first step of synthesizing the ZnSe polycrystal body through the CVD method may include the conventionally known conditions, and are not specifically limited. For example, allowing Zn and $H_2Se$ to react under the condition with a substrate temperature of 550-800° C. and a pressure of 100-2000 Pa can synthesize the ZnSe polycrystal body.

The ZnSe polycrystal body synthesized through such CVD method is constituted by crystal grains generally having an average grain size larger than or equal to 10 μm. According to the present invention, crystal grains having an average grain size of about 5-25 μm is preferably used. This is because excessively large grains may cause breaks during the stage of molding. To have such an average grain size, the substrate temperature is preferably set at a particular temperature of 550-650° C. under the conditions described above.

The manufacturing method according to the present invention does not require machining such as grinding and polishing, as described above. The machining described herein means a process performed to mold a final optical component and discharge machined chip affecting the production costs. Therefore, preliminary processing of molding ZnSe polycrystal body synthesized in the first step so as to be set in the press-molding die used in the second step as well as mirror-polishing processing and the like performed during the preliminary processing are not included in the machining described herein, and such preliminary processing and mirror-polishing processing are not excluded.

EXAMPLES

Hereinafter, examples of the present invention will be described in detail. However, the present invention is limited to these examples.

Examples 1-16 and Comparative Examples 1-4

Firstly, under the conditions described herebelow, a ZnSe polycrystal body was synthesized through the CVD method (first step). Specifically, under the condition with the substrate temperature of 650° C. and the pressure of 2000 Pa, Zn and $H_2Se$ were allowed to react to synthesize the ZnSe polycrystal body.

The ZnSe polycrystal body synthesized in such a manner was processed to have a disc-like shape with a diameter of 10 mm and a thickness of 6 mm before conducting the subsequent second step. The density of the ZnSe polycrystal body in this stage was measured through the Archimedes method, and the measured density was 5.27 g/cm$^3$. An average grain size was measured in a method similar to the method for measuring an optical component, and the measured average grain size was about 20-30 μm.

Next, the ZnSe polycrystal body processed to have a disc-like shape as described above was press-molded to manufacture an optical component (second step).

Specifically, after performing mirror-polishing to the surface of the ZnSe polycrystal body processed to have a disc-like shape as described above, the ZnSe polycrystal body was set in a press-molding die made of glassy carbon. This die was constituted by a pair of upper and lower dies and a ring-like cylinder surrounding the outer circumference of the dies. One die was a mirror-polished planar die, and the other die had a convex mirror-polished surface having a curvature radius of 19.89 mm.

After the series of dies having the ZnSe polycrystal body placed therein is set in a press-molding machine (product name: "GMP-207" manufactured by Toshiba Machine Co., Ltd), a vacuum state was provided to a sample chamber, and heating was performed up to the temperature of 450° C. Thereafter, nitrogen gas was enclosed as inert gas to produce an inert gas atmosphere, and then heating was performed up to the molding temperatures described in Table 1.

Next, after the temperature has reached the molding temperatures, pressing was performed at the rate of 0.02 kN/second, and a load was applied to reach the maximum loads shown in Table 1. The maximum loads were maintained for 5 minutes to manufacture an optical component (lens). The pressures (maximum surface contact pressures) calculated from the maximum loads and the surface area of the die (optical component) are shown as the molding pressures in Table 1.

The curvature radius (R value) of the convex shape of the optical component (lens) obtained in the manner described above was measured using three-dimensional shape measuring equipment (product name: "UA3P" manufactured by Panasonic Corporation). Difference ΔR between measurement results (R value) of the optical component (lens) and the curvature radius of die (19.89 mm) for each of Examples and Comparative Examples (the difference between the R value and the curvature radius of the die is indicated by a ratio (%) with respect to the curvature radius of the die) are shown in Table 1. An evaluation criterion is set such that ΔR within ±1% is a good product.

After the optical component obtained in the manner described above was etched with hydrochloric acid, the average grain size of crystal grains and the relative density of the ZnSe polycrystal body were calculated by the method described above. The results are shown in the following Table 1.

TABLE 1

| | Molding Temperature (° C.) | Maximum Load (kN) | Molding Pressure (MPa) | R value (mm) | ΔR (%) | Relative Density (%) | Average Grain Size (μm) |
|---|---|---|---|---|---|---|---|
| Example 1 | 920 | 2 | 25.48 | 20.0695 | 0.902 | 100 | 60 |
| Example 2 | 920 | 4.5 | 57.33 | 20.0326 | 0.717 | 100 | 50 |
| Example 3 | 940 | 3 | 38.21 | 19.9563 | 0.333 | 99.99 | 160 |
| Example 4 | 940 | 4 | 50.95 | 19.9169 | 0.135 | 100 | 150 |
| Example 5 | 950 | 2.5 | 31.85 | 19.9055 | 0.078 | 100 | 270 |
| Example 6 | 950 | 4.5 | 57.33 | 19.8742 | −0.079 | 99.99 | 260 |
| Example 7 | 960 | 2.5 | 31.85 | 19.8777 | −0.062 | 99.99 | 480 |
| Example 8 | 960 | 4 | 50.95 | 19.8629 | −0.136 | 100 | 450 |
| Example 9 | 970 | 2 | 25.48 | 19.8568 | −0.167 | 100 | 660 |
| Example 10 | 970 | 3 | 38.21 | 19.8453 | −0.225 | 100 | 630 |
| Example 11 | 980 | 2.5 | 31.85 | 19.7851 | −0.527 | 100 | 790 |
| Example 12 | 980 | 3.5 | 44.59 | 19.7694 | −0.471 | 99.99 | 780 |
| Example 13 | 1000 | 2 | 25.48 | 19.7582 | −0.663 | 99.99 | 990 |
| Example 14 | 1000 | 4.5 | 57.33 | 19.7223 | −0.843 | 99.99 | 980 |
| Example 15 | 1020 | 3 | 38.21 | 19.7352 | −0.778 | 99.98 | 990 |
| Example 16 | 1020 | 4 | 50.95 | 19.7225 | −0.842 | 99.98 | 980 |
| Comparative Example 1 | 910 | 3.5 | 15.00 | 20.1051 | 1.081 | 100 | 30 |
| Comparative Example 2 | 910 | 4.5 | 57.33 | — | — | 100 | 35 |
| Comparative Example 3 | 910 | 5 | 63.69 | — | — | 100 | 40 |
| Comparative Example 4 | 1050 | 3 | 38.21 | — | — | 99.98 | 1300 |

In Table 1, the blanks in "R value" and "ΔR" indicate that the values could not be measured due to breakage or partial vaporization in the optical component in the second step.

As is apparent from Table 1, the optical component of each Example can be produced favorably, as compared to the optical component of each Comparative Example. Therefore, a superior effect was confirmed that the optical component of the present invention can be manufactured in an inexpensive manner without employing machining such as grinding and polishing.

Embodiments and examples of the present invention are described above. Appropriate combinations of the configurations of each embodiment and example are envisioned from the beginning.

It should be understood that the embodiments and examples disclosed herein are illustrative and nonrestrictive in every respect. The scope of the present invention is defined by the terms of the claims, rather than the embodiments and examples set forth above, and is intended to include any modification within the scope and meaning equivalent to the terms of the claims.

The invention claimed is:

1. An optical component composed of a ZnSe polycrystal body,
said ZnSe polycrystal body being constituted by crystal grains with an average grain size larger than or equal to 50 μm and smaller than or equal to 1 mm and having a relative density higher than or equal to 99%.

2. A method for manufacturing the optical component according to claim 1, the method comprising:
a first step of synthesizing a ZnSe polycrystal body through a CVD method; and
a second step of press-molding the ZnSe polycrystal body synthesized in said first step, wherein
said second step is conducted under a condition that a load is applied for at least 5 minutes in an inert gas atmosphere with a temperature higher than or equal to 920° C. and lower than or equal to 1030° C. and a pressure higher than or equal to 20 MPa and lower than or equal to 60 MPa,
said second step is conducted by setting said ZnSe polycrystal body in a press-molding die.

3. The method for manufacturing according to claim 2, wherein
said press-molding die is made of glassy carbon or a sintered compact of silicon carbide.

* * * * *